United States Patent
Chan et al.

(10) Patent No.: US 10,725,972 B2
(45) Date of Patent: Jul. 28, 2020

(54) CONTINUOUS AND CONCURRENT DEVICE EXPERIENCE IN A MULTI-DEVICE ECOSYSTEM

(71) Applicant: Razer (Asia-Pacific) Pte. Ltd., Singapore (SG)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 585 days.

(21) Appl. No.: 14/222,221

(22) Filed: Mar. 21, 2014

(65) Prior Publication Data

US 2014/0289415 A1  Sep. 25, 2014

Related U.S. Application Data

(60) Provisional application No. 61/804,134, filed on Mar. 21, 2013.

(51) Int. Cl.
| | |
|---|---|
| *H01Q 5/00* | (2015.01) |
| *H01Q 1/00* | (2006.01) |
| *G06F 16/178* | (2019.01) |
| *G06F 9/54* | (2006.01) |
| *G06F 16/16* | (2019.01) |
| *G06F 16/27* | (2019.01) |
| *G06F 16/11* | (2019.01) |
| *G06F 16/182* | (2019.01) |
| *G06F 16/17* | (2019.01) |
| *G06F 16/2457* | (2019.01) |
| *H04L 29/08* | (2006.01) |
| *G06F 11/14* | (2006.01) |
| *H04L 12/24* | (2006.01) |
| *H04L 12/911* | (2013.01) |
| *H04L 29/06* | (2006.01) |
| *H04W 12/06* | (2009.01) |
| *G06F 8/41* | (2018.01) |

(52) U.S. Cl.
CPC .............. *G06F 16/178* (2019.01); *G06F 8/44* (2013.01); *G06F 9/54* (2013.01); *G06F 11/1464* (2013.01); *G06F 16/113* (2019.01); *G06F 16/116* (2019.01); *G06F 16/122* (2019.01); *G06F 16/16* (2019.01); *G06F 16/168* (2019.01); *G06F 16/1734* (2019.01); *G06F 16/1787* (2019.01); *G06F 16/182* (2019.01); *G06F 16/24578* (2019.01); *G06F 16/27* (2019.01); *H04L 41/0816* (2013.01); *H04L 47/70* (2013.01); *H04L 47/78* (2013.01); *H04L 63/0853* (2013.01); *H04L 67/06* (2013.01); *H04L 67/10* (2013.01); *H04L 67/1095* (2013.01); *H04L 67/1097* (2013.01); *H04L 67/22* (2013.01); *H04L 67/306* (2013.01); *H04L 69/04* (2013.01); *H04W 12/06* (2013.01); *G06F 11/1451* (2013.01); *G06F 11/1469* (2013.01)

(58) Field of Classification Search
CPC ........... H04M 3/5232; G06F 17/30017; G06Q 10/10; H04L 29/06027; H04N 21/41407; H04N 21/2387
See application file for complete search history.

(56) References Cited

U.S. PATENT DOCUMENTS

| | | | |
|---|---|---|---|
| 8,607,086 B2 | 12/2013 | Cullimore | |
| 8,880,648 B1 * | 11/2014 | Arora | H04N 21/4126 709/218 |
| 2003/0097659 A1 * | 5/2003 | Goldman | H04L 29/06027 725/89 |
| 2003/0229900 A1 * | 12/2003 | Reisman | G06F 16/954 725/87 |
| 2006/0114852 A1 * | 6/2006 | Levien | H04W 4/16 370/329 |
| 2007/0060054 A1 * | 3/2007 | Romesburg | H04M 1/6041 455/41.2 |
| 2007/0174815 A1 * | 7/2007 | Chrysanthakopoulos | H04L 67/02 717/120 |
| 2008/0039080 A1 * | 2/2008 | Bertagnole | H04M 3/42238 455/433 |

(Continued)

OTHER PUBLICATIONS

U.S. Appl. No. 14/179,778 by Bornstein, Daniel R., filed Feb. 13, 2014.

(Continued)

*Primary Examiner* — Nicholas R Taylor
*Assistant Examiner* — Ho T Shiu
(74) *Attorney, Agent, or Firm* — Mattingly & Malur, PC (57) ABSTRACT

Various embodiments generally relate to decentralized operating systems spanning multiple devices. More specifically, some embodiments relate to continuous and concurrent device experiences across the multiple devices. For example, a user may be streaming a movie through a service provided via a smart television. When the user's phone detects an incoming video call, the television can recognize that a video call is coming in and ask the user if the user wants to answer the call. If the user responds in the affirmative, the television can pause the streaming video from the service provide allowing the user to answer their phone. In some cases, the television can be used as the display screen to display the video call while the local phone resources (e.g., video camera) can be used as the recording device.

20 Claims, 7 Drawing Sheets

(56) References Cited

U.S. PATENT DOCUMENTS

| | | | |
|---|---|---|---|
| 2009/0079813 A1* | 3/2009 | Hildreth | H04N 7/147 348/14.03 |
| 2011/0301728 A1* | 12/2011 | Hamilton | G11B 27/034 700/94 |
| 2012/0258722 A1* | 10/2012 | Liu | G06F 9/5022 455/450 |
| 2013/0061070 A1 | 3/2013 | Cullimore | |
| 2013/0166580 A1* | 6/2013 | Maharajh | H04L 65/605 707/758 |
| 2014/0163971 A1* | 6/2014 | Song | H04R 3/00 704/201 |
| 2014/0187221 A1* | 7/2014 | Ramachandran | H04W 4/001 455/418 |
| 2014/0201377 A1* | 7/2014 | Kadishay | H04L 65/1069 709/227 |
| 2015/0245398 A1* | 8/2015 | Cserna | H04L 67/303 455/41.1 |

OTHER PUBLICATIONS

U.S. Appl. No. 14/221,095 by Chan, M.A. et al., filed Mar. 20, 2014.

* cited by examiner

CONTINUOUS AND CONCURRENT DEVICE EXPERIENCE IN A MULTI-DEVICE ECOSYSTEM

CROSS-REFERENCES TO RELATED APPLICATIONS

This application claims the benefit of U.S. Provisional Application No. 61/804,134, filed Mar. 21, 2013, which is hereby incorporated by reference in its entirety for all purposes.

TECHNICAL FIELD

Various embodiments generally relate to decentralized operating systems spanning multiple devices. More specifically, some embodiments relate to continuous and concurrent device experiences across the multiple devices.

BACKGROUND

Computing devices such as mobile phones, smartphones, and tablet computers have become ubiquitous in today's society. In fact, many individuals use a number of computing devices to perform various tasks during the course of their day. For instance, a person/user may use a laptop for work, a tablet for entertainment, a smartphone for phone calls, etc. Further, given the convergence of capabilities amongst the various computing devices, the user may use any of the computing devices to perform many of their tasks. For example, devices such as smart televisions, mobile phones, tablets, laptops, and others may be capable of streaming video from the internet.

While computing devices have become able to communicate through various communication protocols, there has been no efficient way for these devices to interoperate. Instead, each computing device has traditionally been completely independent. For example, each computing device typically has had its own operating system to manage the unique hardware resources available only to that computing device.

SUMMARY

Various embodiments generally relate to decentralized operating systems spanning multiple devices. More specifically, some embodiments relate to continuous and concurrent device experiences across the multiple devices. Some embodiments provide for a method that includes executing a first activity session on a first computing device. The first computing device may be part of a group of multiple computing devices having a decentralized operating system that spans the multiple computing devices. The decentralized operating system is responsible for managing the hardware resources of the multiple devices. As such, when a second activity session is being initiated at one or more of the computing devices in the group of multiple computing devices, the decentralized operating system can manage how the second activity session is processed (e.g., which resources are utilized). In some embodiments, a determination can be made as to whether to switch from the first activity session at the first computing device to the second activity session. The first activity session on the first computing device may be paused, for example, while the second activity session is allowed to begin.

For example, a user may be streaming a movie through a service provided via a smart television. When the user's phone detects an incoming call, the television can recognize that a call is coming in and ask the user if the user wants to answer the call. If the user responds in the affirmative, the television can pause the streaming video allowing the user to answer their phone.

In other embodiments, an activity session on a first computing device may be transferred to a second computing device within a multi-device ecosystem. In some embodiments, the multi-device ecosystem may have a decentralized operating system that spans the multiple computing devices capable of facilitating the session transfer. For example, a user can be using a phone to stream music. When the user walks in the front door of their house, the user may want to transfer the streaming music session to a home sound system. Various embodiments allow a user to set customized rules indicating when a transfer should happen automatically or when the user should be prompted for confirmation before initiating the transfer. The transferred session can continue at current state. The decentralized operating system facilitates the device discovery making the transfer easier. For example, in some embodiments, the decentralized operating system can determine the capabilities of each device and determine if a transfer would be successful.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments generally relate to decentralized operating systems spanning multiple devices. More specifically, some embodiments relate to continuous and concurrent device experiences across the multiple devices. Some embodiments provide for a method that includes executing a first activity session on a first computing device. The first computing device may be part of a group of multiple computing devices having a decentralized operating system that spans the multiple computing devices. The decentralized operating system is responsible for managing the hardware resources of the multiple devices. As such, when a second activity session is being initiated at one or more of the computing devices in the group of multiple computing devices, the decentralized operating system can manage how the second activity session utilizes available resources, if the second activity session should be terminated, if the second activity session should be allowed to begin, etc. In some embodiments, a determination can be made as to whether to switch from the first activity session at the first computing device to the second activity session. The first activity session on the first computing device may be paused, for example, while the second activity session is allowed to begin.

For example, a user may be streaming a movie through a service provided via a smart television. When the user's phone detects an incoming call, the television can recognize that a call is coming in and ask the user if the user wants to answer the call. If the user responds in the affirmative, the television can pause the streaming video allowing the user to answer their phone.

In other embodiments, an activity session on a first computing device may be transferred to a second computing device within a multi-device ecosystem. In some embodiments, the multi-device ecosystem may have a decentralized operating system that spans the multiple computing devices capable of facilitating the session transfer. For example, a user can be using a phone to stream music. When the user walks in the front door of their house, the user may want to transfer the streaming music session to a home sound system. Various embodiments allow a user to set customized rules indicating when a transfer should happen automatically or when the user should be prompted for confirmation before initiating the transfer. The transferred session can continue at the current state of the activity session. The decentralized operating system facilitates the device discovery making the transfer easier. For example, in some embodiments, the decentralized operating system can determine the capabilities of each device and determine if a transfer would be successful.

For example, some embodiments allow a user to interact with a browser page, a file, etc. on one device and then pick up the session at a second device. In some embodiments for example, a transfer icon may be displayed that allows the user to pull the experience off the previous device and continue to engage and interact with it as if the entire experience was on the second device.

In some embodiments, computing devices can be transformed into peripherals devices for receiving inputs and generating outputs. For example, a CPU/GPU may be used as a peripheral. As such, when one device is plugged in and the other one is not, the CPU/GPU of the device that is plugged in can be used for processing. As another example, a user can use two or more devices at the same time to do the same/similar thing. These techniques can allow applications and developers to see that there are multiple devices running the application at the same time. Still yet, these techniques can also allow a first device to take a screenshot of another device.

Peripherals can also recognize whether they are near each other (NFC) and communicate with each other and can optimize performance based on peripheral location. For example, nearby peripherals can utilize the more charged peripheral for chatting/mapping/etc. Suppose you have a tablet and N devices, one per player of a game. The tablet can show a shared game state (e.g., a tile board for a board game, or the cards on the table for a card game), and each device can have the secret state (e.g. cards in hand) of each player. In some embodiments, the computing devices can be placed into a hierarchy along with specified directional communication flows in order to facilitate an activity.

As another example, these techniques allow a user's device with a camera to be set up somewhere. Then, the user can control that camera from a second device in the user's possession, including being able to look remotely through the camera's viewfinder, setting various camera parameters, and actually taking photos or shooting video.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. While, for convenience, embodiments of the present invention are described with reference to a multi-device ecosystem having a decentralized operating system, embodiments of the present invention are equally applicable to various other configurations.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other types of media/machine-readable mediums suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

General Description

Figure 1:
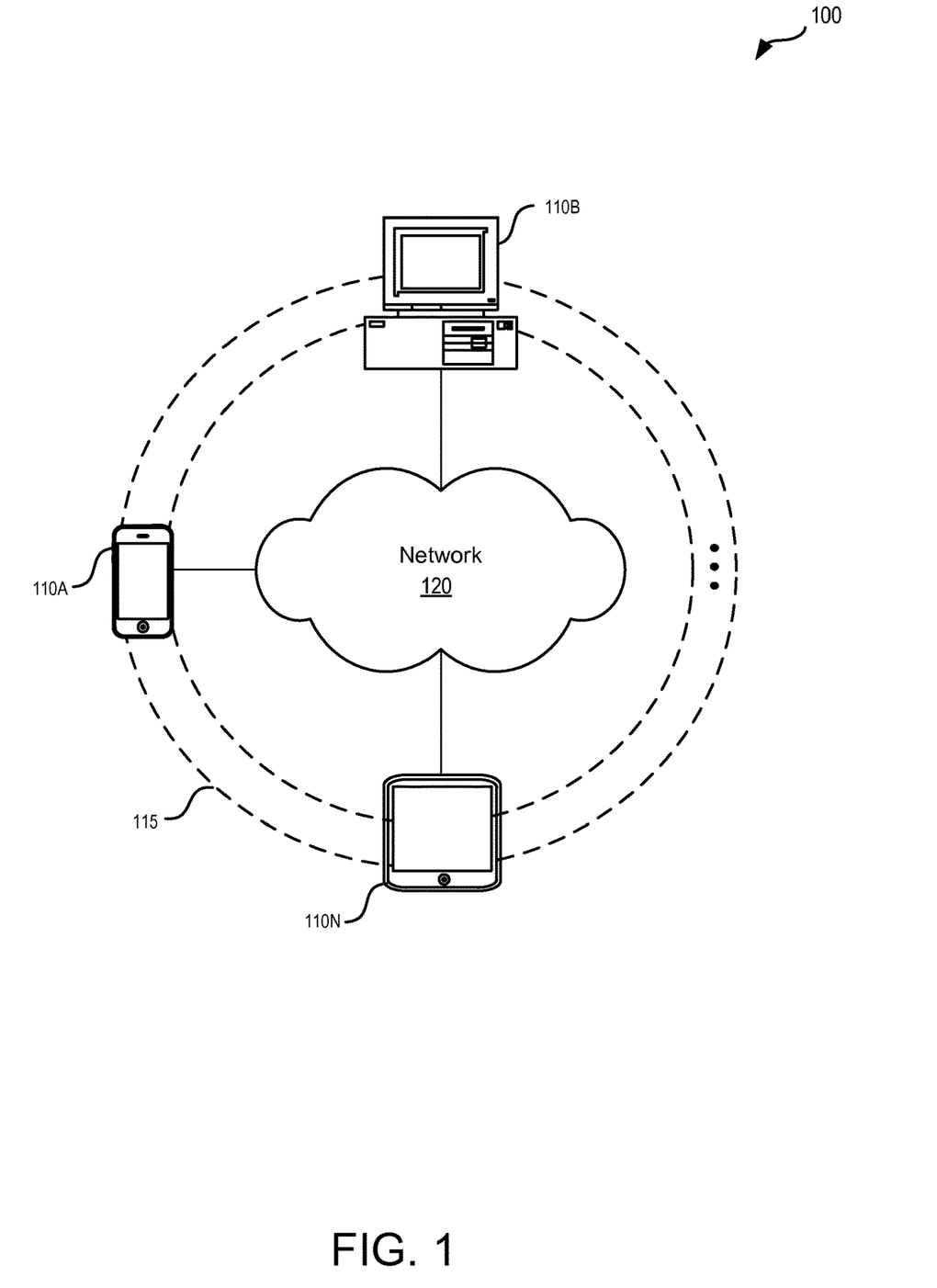
FIG. 1 illustrates an example of a network-based environment of multiple computing devices having a decentralized operating system in accordance with various embodiments of the technology.

FIG. 1 illustrates an example of a network-based environment 100 of multiple computing devices having a decentralized operating system in accordance with various embodiments of the technology. As illustrated in FIG. 1, network-based environment 100 may include one or more computing devices 110A-110N (such as a mobile device, a mobile phone, a tablet computer, a laptop, a mobile media device, a mobile gaming device, a vehicle-based computer, a smart television, a wearable computing technology, etc.). In accordance with various embodiments, computing devices 110A-110N may have a decentralized operating system ("DCOS") that manages multiple computing devices 110A-110N as a single entity 115. As a result, each of the computing devices 110A-110N can use resources from any of the other computing devices.

An application can be installed on an application layer of the DCOS. As a result, any of the computing devices being managed by the DCOS can invoke the application installed on the application layer of the DCOS. Thus, a separate installation of the application on each of the computing devices is not required to execute the application through any of the computing devices if the application is installed through the DCOS managing the computing devices.

In some embodiments, an instance of the DCOS executes using the hardware resources of the multiple computing devices and manages the hardware resources of all the computing devices as a single entity 115. The various components of the DCOS (e.g., file system of the DCOS) can be stored across the hardware resources of the multiple computing devices. For instance, the data associated with a file system of the DCOS can be stored across the memory resources of the various computing devices. The DCOS gathers any required data associated with the file system from across the computing devices when needing to provide access the file system.

Similarly, the execution of an instance of the DCOS can be performed using the hardware resources that are available across the computing devices. For instance, when a thread associated with the executing instance of this DCOS wants to execute a function, a kernel of the DCOS translates the function into data processing instructions and coordinates the various local OS kernels managing the hardware resources (e.g., CPU, memory, etc.) of each of the computing devices to execute the instructions.

In one or more embodiments, the DCOS can manage the multiple computing devices 110A-110N as a single entity 115 by networking all of the multiple computing devices 110A-110N. The multiple computing devices 110A-110N may communicate with each other through a network 120. The computing devices 110A-110N can include network communication components that enable the computing devices 110A-110N to communicate with network 120 or other electronic devices by transmitting and receiving wireless signals using licensed, semi-licensed or unlicensed spectrum over network 120. In some cases, network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS), Enhanced Data rates for GSM Evolution (EDGE), Universal Mobile Telecommunications System (UMTS), or Long Term Evolution (LTE) network), or other communications network.

Figure 2:
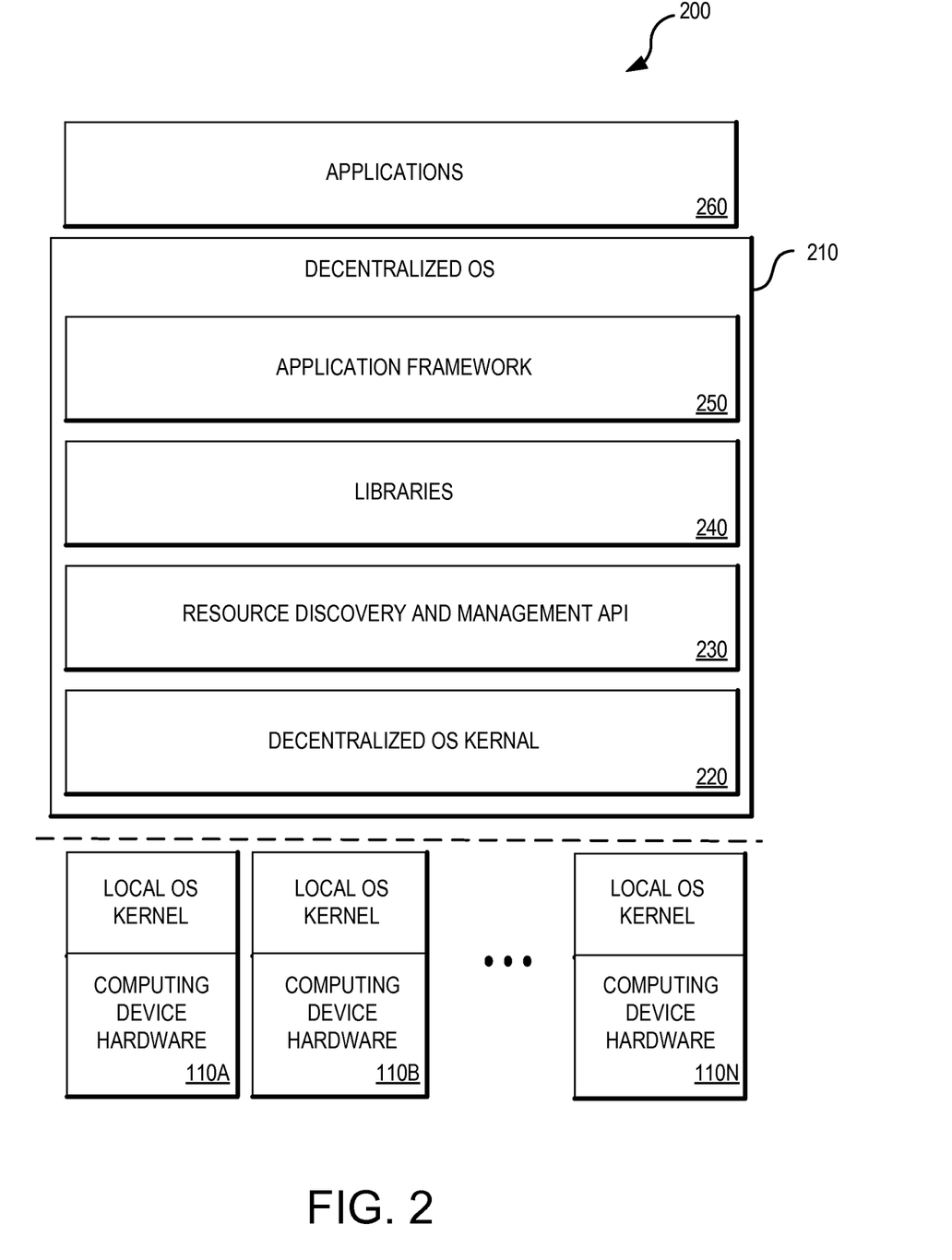
FIG. 2 is a block diagram illustrating an example of components in a network-based environment of multiple computing devices in accordance with one or more embodiments of the technology.

FIG. 2 is a block diagram illustrating an example of components in a network-based environment of multiple computing devices in accordance with one or more embodiments of the technology. The environment 200 can include multiple computing devices 110A-110N that are managed as a single entity by an instance of a DCOS 210 that executes using the hardware resources of the multiple computing devices 110A-110N. As illustrated in FIG. 2, the DCOS 210 may be interposed between the executing applications and the physical hardware resources of the various computing devices 110A-110N to manage/execute the physical hardware resources on behalf of the executing applications. The DCOS 210 can include a DCOS kernel 220 that allows the DCOS 210 to manage the hardware resources of the various computing devices 110A-110N as a single entity.

The computing devices 110A-110N can be a desktop computer, a laptop computer, a tablet computer, a game console, a smart phone, a personal digital assistant, wearable computer, or other electronic devices capable of running computer applications, as contemplated by a person having ordinary skill in the art. The hardware resources of the various computing devices 110A-110N can include central processing units ("CPU"), storage devices, graphics processing units ("GPU"), network communication hardware, a display screen, a video camera, a microphone, accelerometers, gyroscopes, global positioning receivers, environmental sensors, actuators, etc. In some embodiments, the DCOS kernel 220 manages memory access for the storage modules in the various computing devices 110A-110N, determines which applications get access to which hardware resources, maintains a file system to manage the user/application data, and sets up or resets the operating states of CPUs (of computing devices 110A-110N) for optimal operation at all times. In various embodiments, DCOS kernel 220 includes firmware and device drivers that control hardware resources of computing devices 110A-110N at a basic level.

In one or more embodiments, DCOS 210 includes resource discovery and management application programming interfaces ("API") 230 that can interact with local OS kernels (e.g., a Linux kernel) that each directly manage the hardware resources of a respective computing device 110A-110N. Resource discovery and management API 230 can provide the interface for generating resource queries and sending instructions for managing the local resources. In some embodiments, DCOS kernel 220 can use the local OS kernels to control the various hardware resources to perform the tasks/services provided by the DCOS kernel 220.

In various embodiments, DCOS kernel 220 maintains a mapping between the various local OS kernels and the hardware resources that are managed by the local OS kernels. DCOS kernel 220 may use the mapping and the resource discovery and management API 230 to send a request to the local OS kernel that manages the local resources. The local OS kernel then uses firmware to control the resource (e.g., a hard drive, sensor, actuator, etc.).

In embodiments, DCOS 210 can include libraries 240 that enable various operating system related tasks, e.g., file manipulation, to be performed. In some embodiments, the libraries 240 can be written in C, C++, or another programming language. The libraries 240 include, for example, a library to manage the display and windowing manager, a library to support various audio and video formats and codecs including their playback and recording, a library for rendering 2D and 3D graphics, a database library to support a database engine, etc. In embodiments, the libraries 240 can be stored by DCOS 210 across the storage devices of the computing devices 110A-110N.

In some embodiments, the DCOS 210 can include an application framework 250 that offers an array of APIs that can be re-used by developers to perform various standard functions. The applications executing on DCOS 210 can interact directly with the application framework 250 when a standard function included within the application framework 250 is to be executed. In various embodiments, the application framework 250 may include a manager that manages the activities that govern the application life cycle, a manager that enables the applications to create customized alerts, views that are used to create layouts, including components such as grids, lists, buttons, etc., a manager to manage external resources used by the applications, a content provider to enable sharing of data between applications, etc. Resource discovery and management API may be a part of application framework 250 in some embodiments.

In accordance with various embodiments, the application framework 250 can be stored by the DCOS 210 across the storage devices of the computing devices 110A-110N. It should be noted that the above description of the various components of the DCOS 210 are not intended to be exhaustive. The DCOS 210 can include other components that are required for the DCOS 210 to function or can improve the performance of the DCOS 210 as contemplated by a person having ordinary skill in the art. Further, the architecture of the DCOS 210 provided in FIG. 2 is intended as an illustrative example. Therefore, the DCOS 210 can include other architectures as contemplated by a person having ordinary skill in the art.

As illustrated in FIG. 2, the environment 200 can include an application layer 260 consisting of the various computer applications installed on the DCOS 210 and stored using the storage devices of the computing devices 110A-110N. The computer applications installed on DCOS 210 can include applications for general productivity and information retrieval, including email, calendar, contacts, and stock market and weather information. The computer applications can also include applications in other categories, such as mobile games, factory automation, GPS and location-based services, banking, order-tracking, ticket purchases or any other categories as contemplated by a person having ordinary skill in the art.

In some embodiments, an instance of DCOS 210 executes using the hardware resources of the multiple computing devices 110A-110N and manages the hardware resources of all the computing devices 110A-110N as a single entity. For instance, a thread associated with DCOS 210 can be executed by the DCOS 210 with the resources associated with one of the local OS kernels, where the thread-related functions are executed by a CPU associated with the local OS kernel. When the thread wants to execute a function, the DCOS kernel 210 translates the function into data processing instructions and coordinates with the local OS kernel managing the hardware resources (e.g., CPU, memory, etc.) to execute the instructions.

Figure 3:
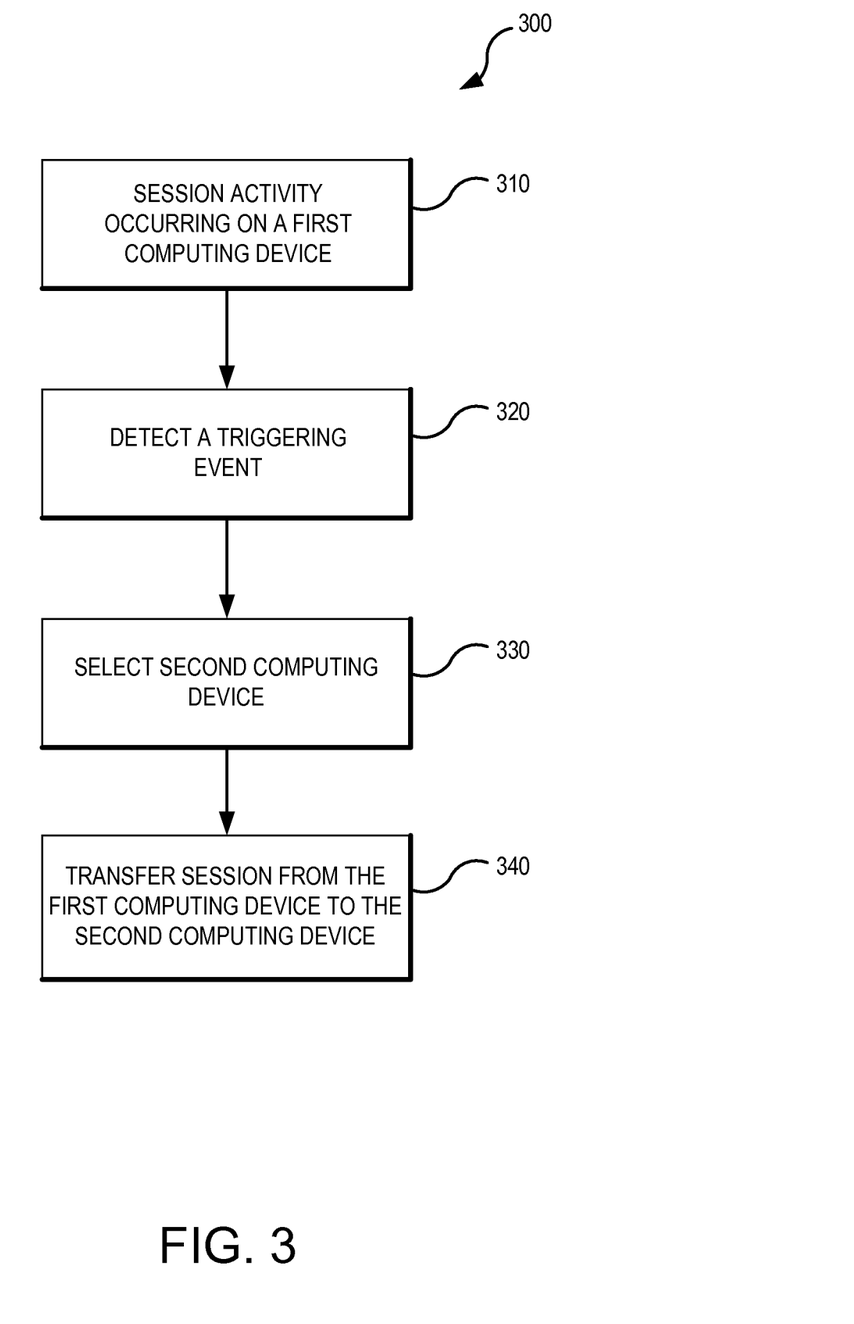
FIG. 3 is a flow diagram illustrating various operations for a continuous device experience in accordance with some embodiments of the technology.

FIG. 3 is a flow diagram illustrating various operations 300 for a continuous device experience in accordance with some embodiments of the technology. As illustrated in FIG. 3, a session activity is occurring on a first computing device during activity operation 310. The session can include any type of activity that the first computing device is capable of performing. For example, the session may include a user playing a game, streaming of music or video, preparing a document, a phone call, web browsing, recording a video, recording audio, or other activity.

When detection operation 320 detects a triggering event, a second computing device can be selecting during selection operation 330. In some embodiments, the second computing device picked during selection operation 330 may be chosen automatically or with user input (e.g., through a graphical user interface screen). The triggering events can include locational events, time-based events, requests to initiate other sessions, environmental triggers, and others. In some embodiments, the triggering events may be combined into more complicated triggering rules which need to be satisfied to generate the triggering event. The triggering events may be set by default or customized by the user. For example, a user may specify that when they are streaming music on their phone and arrive at home (i.e., a location based trigger) that the streaming music session is transferred to a home theater system. As another example, a triggering rule may be customized by the user to let the user know when there are alternative devices within a certain distance that have better speakers when the user is participating in a streaming music session.

Once the second device has been selected, either automatically or through a user selection, the session can be transferred from the first computing device to the second computing device during transfer operation 340. In some embodiments, the session transfer may be managed by the DCOS. The DCOS can determine the capabilities of each computing device and alter the session as appropriate. The DCOS can create and manage the transfer requests which can include fields such as, but not limited to, session ID, originating device, destination device, transfer initiation time, transfer complete time, session parameters, and other fields.

Figure 4:
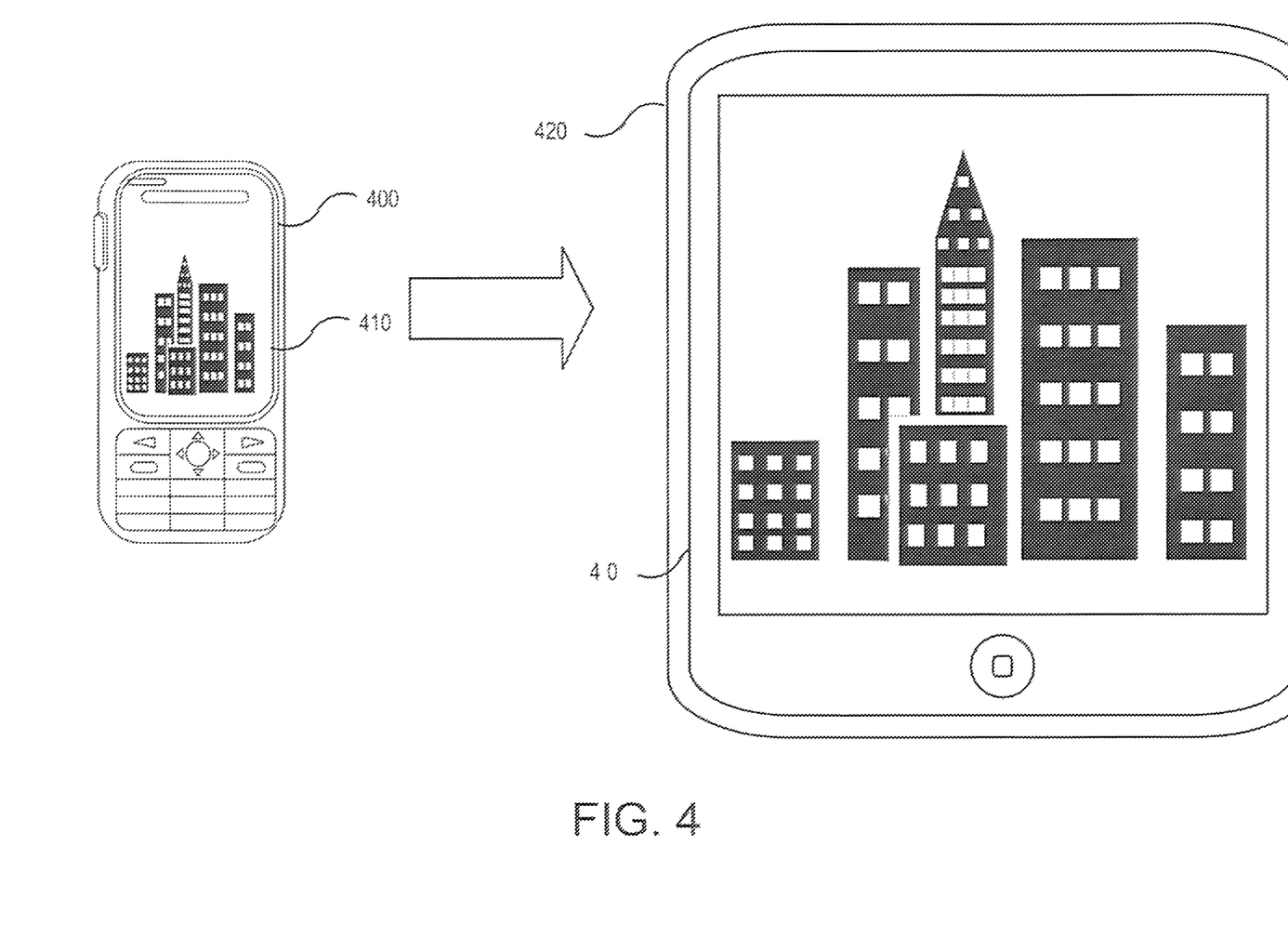
FIG. 4 illustrates an example of a continuous device experience in accordance with various embodiments of the technology.

FIG. 4 illustrates an example of a continuous device experience in accordance with various embodiments of the technology. As illustrated in FIG. 4, first device 400 is performing a session 410. Upon processing the transfer request, session 410 can be seamlessly transferred to second device 420.

Figure 5:
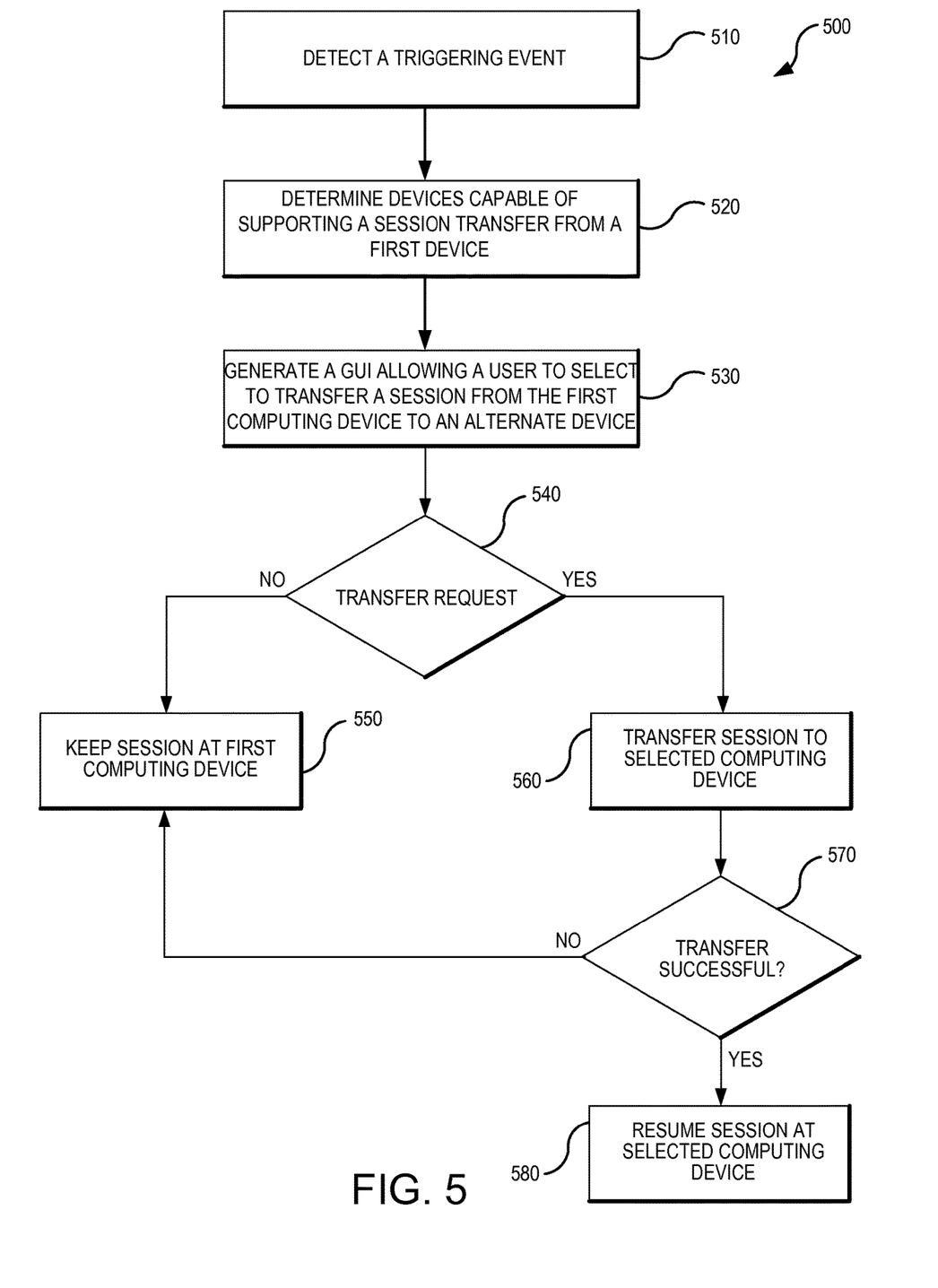
FIG. 5 is a flow diagram illustrating various operations for processing a session transfer request in accordance with one or more embodiments of the technology.

FIG. 5 is a flow diagram illustrating various operations 500 for processing a session transfer request in accordance with one or more embodiments of the technology. As illustrated in FIG. 5, when detection operation 510 detects a triggering event, this causes identification operation 520 to determine devices that are capable of supporting a session transfer from a first device. In order to determine device capabilities, for example, one or more embodiments can send resource queries to the multiple computing devices. In some cases, the resource queries may only go to a subset of the multiple computing devices (e.g., based on geographical location, communication bandwidth, or other factors). Then, generation operation 530 generates a graphical user interface that allows a user to select to transfer a session from the first computing device to an alternative device identified by identification operation 520.

Determination operation 540 determines if the user has requested a transfer of the session in response to the presentation of the graphical user interface. If determination operation 540 determines that no transfer request has been made, then determination operation 540 branches to maintain operation 550 where the session is maintained at the current device. If determination operation 540 determines that a transfer request has been made, then determination operation 540 branches to transfer operation 560 where the session is transferred to the selected computing device.

Success operation 570 determines if the session has been successfully transferred to the selected computing device. If success operation 570 determines that the transfer was unsuccessful, then success operation 570 branches to maintain operation 550 where the session is maintained at the first computing device. If success operation 570 determines that the transfer was successful, then success operation 570 branches to resume operation 580 where the session is resumed at the selected computing device.

Figure 6:
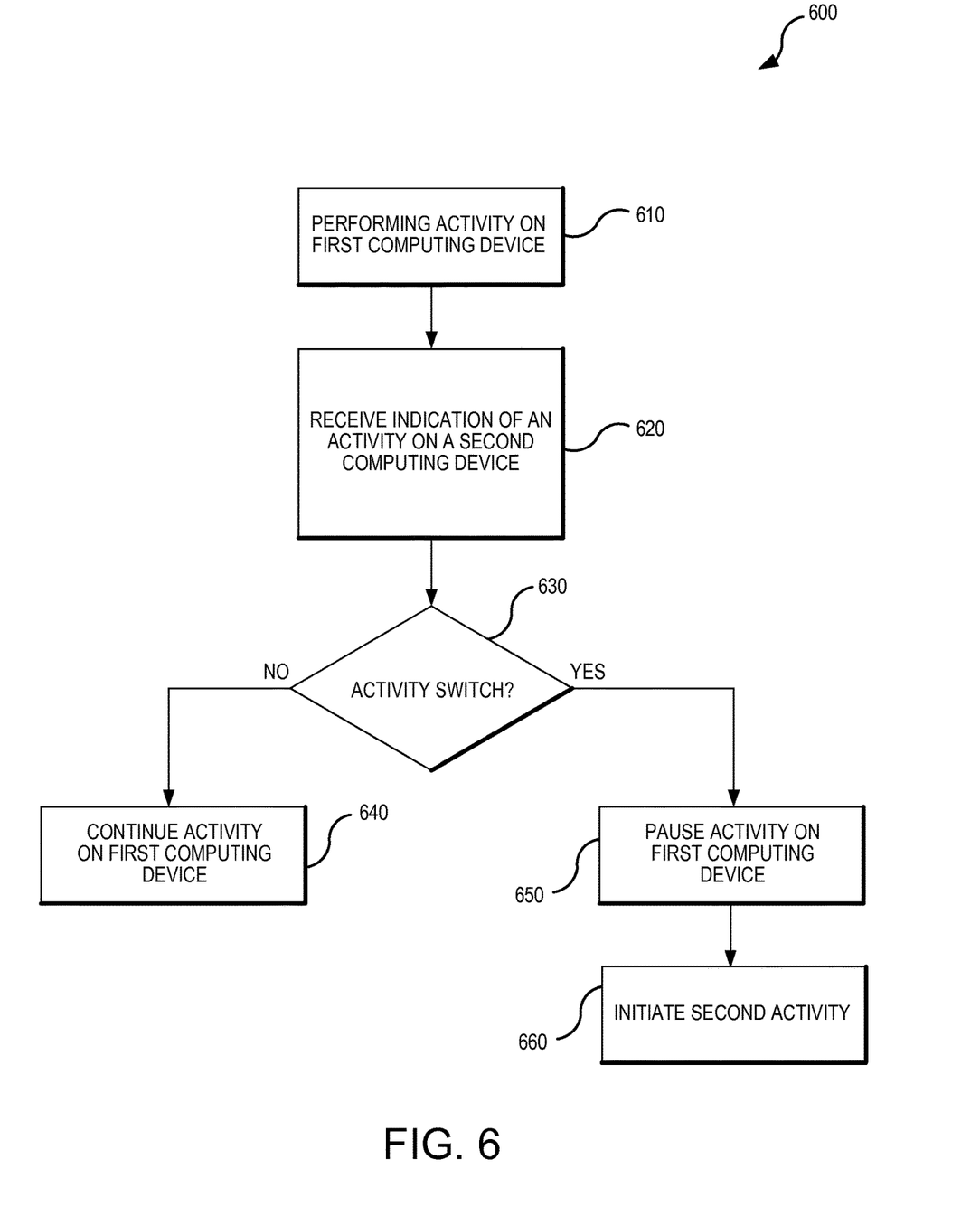
FIG. 6 is a flow diagram illustrating various operations for a concurrent device experience in accordance with some embodiments of the technology.

FIG. 6 is a flow diagram illustrating various operations 600 for a concurrent device experience in accordance with some embodiments of the technology. During performance operation 610, an activity is being performed on a first computing device. During receiving operation 620, the DCOS may receive an indication of a second activity being initiated or performed on a second computing device. Determination operation 630 determines if activities should be switched. If determination operation 630 determines that the activity on the first device should not be switched for the second activity, determination operation 630 branches to continuation operation 640 where the activity on the first computing device is continued. If determination operation 630 determines that the activity on the first device should be switched to the second activity, determination operation 630 branches to pause operation 650 where the activity on the first computing device can be paused. The second activity can be initiated (maybe even on the first computing device if supported) during initiation operation 660.

For example, while a user is watching television, a call might arrive on their phone. The DCOS can recognize that a call is coming in on the phone and alert the user via the television. If the television is capable of supporting a phone call, then the user may also be prompted to have the phone call answered through the television. As another example, if the phone session is a video chat, the television may be used as the display screen and for presenting the audio from the other person while a microphone, camera, or other recording device in the phone is used to record audio/video of the user.

Exemplary Computer System Overview

Figure 7:
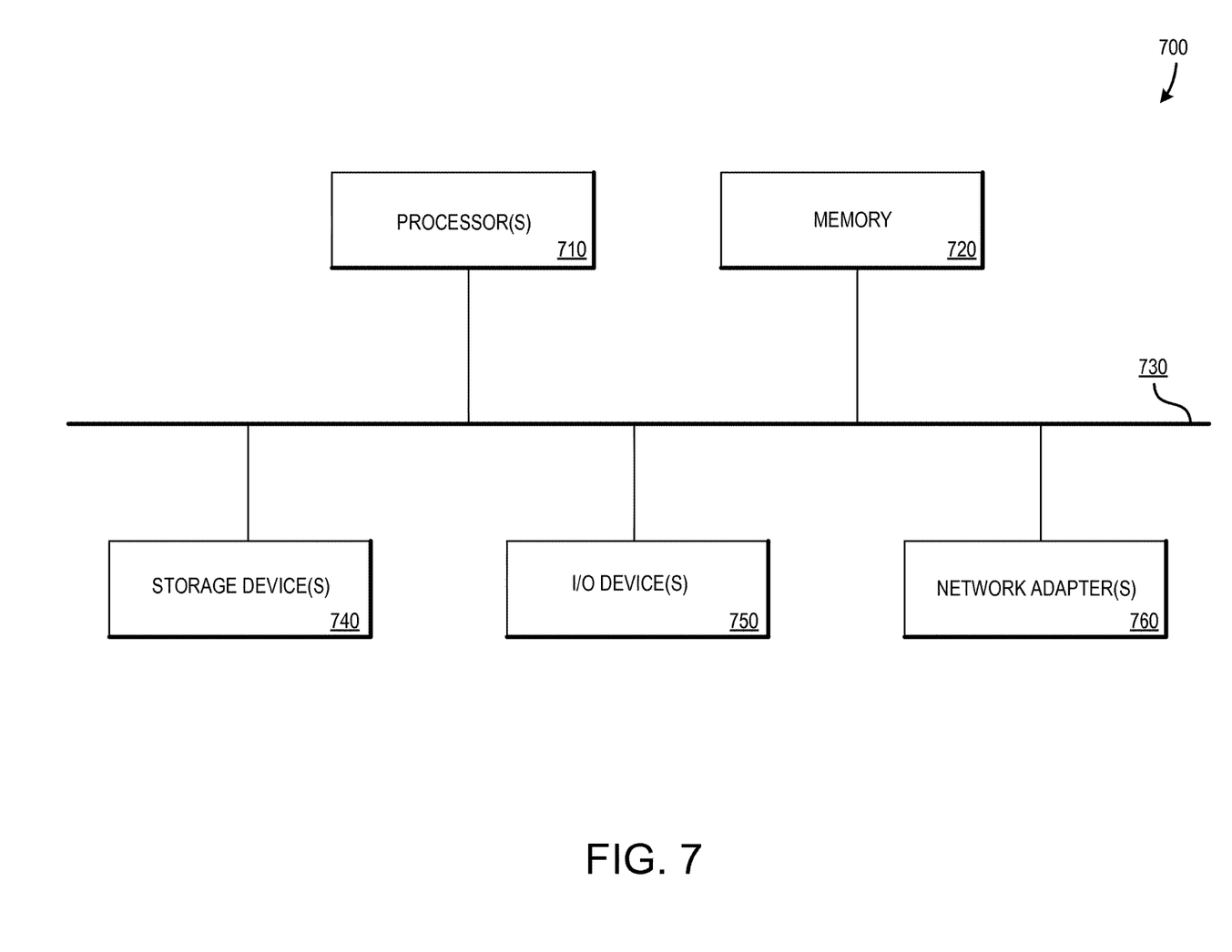
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may include one or more central processing units ("processors") 710, memory 720, input/output devices 750 (e.g., keyboard and pointing devices, display devices), storage devices 740 (e.g., disk drives, flash memory, etc.), and network adapters 760 (e.g., network interfaces) that are connected to an interconnect 730. The interconnect 730 is illustrated as an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus, also called "Firewire", or any type of cellular, IP-based or converged telecommunications network, including but not limited to Global System for Mobile Communications (GSM), Worldwide Interoperability for Microwave Access (WiMAX), etc.

The memory 720 and storage devices 740 are computer-readable storage media that may store instructions that implement at least portions of the described technology. In addition, the data structures and message structures may be stored or transmitted via a data transmission medium, such as a signal on a communications link. Various communications links may be used, such as a point-to-point dial-up connection. Thus, computer-readable media can include computer-readable storage media (e.g., "non-transitory" media) and computer-readable transmission media.

The instructions stored in memory 720 can be implemented as software and/or firmware to program the processor(s) 710 to carry out actions described above. In some embodiments, such software or firmware may be initially provided to the processing system 700 by downloading it from a remote system through the computing system 700 (e.g., via network adapter 760).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as defined by the appended claims.

What is claimed is:

1. A computer-implemented method comprising:
    executing a first activity session at a first computing device of multiple computing devices having a decentralized operating system (DCOS) executed on the multiple computing devices, the DCOS including a DCOS kernel that communicates via one or more application programming interfaces (APIs) with respective local operating system (OS) kernels executing on respective ones of the multiple computing devices;
    recognizing, by the DCOS, that a second activity session is being initiated at a second computing device of the multiple computing devices;
    determining, by the DCOS, whether to switch from the first activity session at the first computing device to the second activity session at the first computing device based on device proximity between the first computing device and the second computing device and local resource availability at the first computing device; and
    in response to a determination of switching from the first activity session at the first computing device to the second activity session at the first computing device, sending, by the DCOS kernel, via the one or more APIs, a request to the local OS kernel of the first computing device to pause the first activity session on the first computing device and allow the second activity session to begin on the first computing device, the request causing the local OS kernel of the first computing device to manage at least one hardware resource of the first computing device to begin the second activity session at the first computing device.

2. The computer-implemented method of claim 1, wherein the DCOS kernel maintains a mapping between the respective local OS kernels and respective hardware resources that are managed by the respective local OS kernels on the respective multiple computing devices, the method further comprising determining, by the DCOS, whether the first computing device has sufficient local resources to support the second activity session based at least on the mapping.

3. The computer-implemented method of claim 2, wherein the second activity session is requested to begin on the first computing device when the first computing device is determined, by the DCOS, through communication of the DCOS kernel with the local OS kernel of the first computing device, via the one or more APIs, to have sufficient local resources to support the second activity session.

4. The computer-implemented method of claim 1, wherein determining, by the DCOS, whether to switch from the first activity session at the first computing device to the second activity session at the first computing device includes generating a graphical user interface at the first computing device alerting a user to the second activity session being initiated at the second computing device.

5. The computer-implemented method of claim 1, further comprising determining a location of each of the multiple computing devices.

6. The computer-implemented method of claim 1, wherein the DCOS kernel manages hardware resources of the multiple computing devices at least through communication, via the one or more APIs, with the respective local OS kernels executing on the respective multiple computing devices.

7. The computer-implemented method of claim 6, further comprising prioritizing multiple transfer requests to the first computing device based on a user priority, an activity priority, or a location priority.

8. The computer-implemented method of claim 1, further comprising resuming the first activity session when the second activity session is completed.

9. A system comprising:
    means for executing a first activity session at a first computing device of multiple computing devices having a decentralized operating system (DCOS) executed on the multiple computing devices, the DCOS including a DCOS kernel that communicates via one or more application programming interfaces (APIs) with respective local operating system (OS) kernels executing on respective ones of the multiple computing devices;
    means for recognizing, by the DCOS, that a second activity session is being initiated at a second computing device of the multiple computing devices;
    means for determining, by the DCOS, whether to switch from the first activity session at the first computing device to the second activity session at the first computing device based on device proximity between the first computing device and the second computing device and local resource availability at the first computing device; and
    means for sending, by the DCOS kernel, via the one or more APIs, a request to the local OS kernel of the first computing device to pause the first activity session on the first computing device and allow the second activity session to begin on the first computing device in response to a determination of switching from the first activity session at the first computing device to the second activity session at the first computing device, the request causing the local OS kernel of the first computing device to manage at least one hardware resource of the first computing device to begin the second activity session at the first computing device.

10. The system of claim 9, wherein the DCOS kernel maintains a mapping between the respective local OS kernels and respective hardware resources that are managed by the respective local OS kernels on the respective multiple computing devices, the system further comprising means for determining, by the DCOS kernel, whether the first computing device has sufficient local resources to support the second activity session based at least on the mapping.

11. The system of claim 10, wherein the second activity session is requested to begin on the first computing device when the first computing device is determined by the DCOS, through communication of the DCOS kernel with the local OS kernel of the first computing device, via the one or more APIs, to have sufficient local resources to support the second activity session.

12. The system of claim 9, wherein the means for determining, by the DCOS, whether to switch from the first activity session at the first computing device to the second activity session at the first computing device comprises means for generating a graphical user interface at the first computing device alerting a user to the second activity session being initiated at the second computing device.

13. The system of claim 9, wherein the DCOS kernel manages hardware resources of the multiple computing devices at least through communication, via the one or more APIs, with the respective local OS kernels executing on the respective multiple computing devices.

14. The system of claim 13, further comprising means for prioritizing multiple transfer requests to the first computing device based on a user priority, an activity priority, or a location priority.

15. A method comprising:
executing a decentralized operating system (DCOS) using hardware resources of a plurality of computing devices, the DCOS including a DCOS kernel that communicates via one or more application programming interfaces (APIs) with respective local operating system (OS) kernels executing on respective ones of the plurality of computing devices, the plurality of computing devices including a first computing device and a second computing device;
executing a first activity session at the first computing device;
recognizing, by the DCOS, that a second activity session is being initiated at the second computing device;
determining, by the DCOS, to switch from the first activity session at the first computing device to the second activity session at the first computing device based on device proximity between the first computing device and the second computing device and local resource availability at the first computing device; and
in response to determining to switch from the first activity session at the first computing device to the second activity session at the first computing device, sending, by the DCOS kernel, via the one or more APIs, a request to the local OS kernel of the first computing device to pause the first activity session on the first computing device and allow the second activity session to begin on the first computing device, the request causing the local OS kernel of the first computing device to control at least one hardware resource of the first computing device to pause the first activity session and execute the second activity session at the first computing device.

16. The method of claim 15, wherein the DCOS kernel maintains a mapping between the respective local OS kernels and respective hardware resources that are managed by the respective local OS kernels on the respective plurality of computing devices, the method further comprising determining, by the DCOS, whether the first computing device has sufficient local resources to support the second activity session based at least on the mapping.

17. The method of claim 16, wherein the second activity session is requested to begin on the first computing device when the first computing device is determined by the DCOS, through communication of the DCOS kernel with the local OS kernel of the first computing device, via the one or more APIs, to have sufficient local resources to support the second activity session.

18. The method of claim 15, wherein determining, by the DCOS, to switch from the first activity session at the first computing device to the second activity session at the first computing device includes generating a graphical user interface at the first computing device alerting a user to the second activity session being initiated at the second computing device.

19. The method of claim 18, further comprising receiving, by the DCOS, via the graphical user interface, a user input indicating acceptance of transfer of the activity session from the second computing device to the first computing device.

20. The method of claim 15, wherein the DCOS kernel manages hardware resources of the plurality of computing devices at least through communication, via the one or more APIs, with the respective local OS kernels executing on the respective multiple computing devices.

* * * * *